Nov. 26, 1929.  H. S. MACKAY  1,737,425
ELECTROCHEMICAL PROCESS FOR THE EXTRACTION
OF COPPER AND ZINC FROM ORES
Filed Jan. 28, 1926
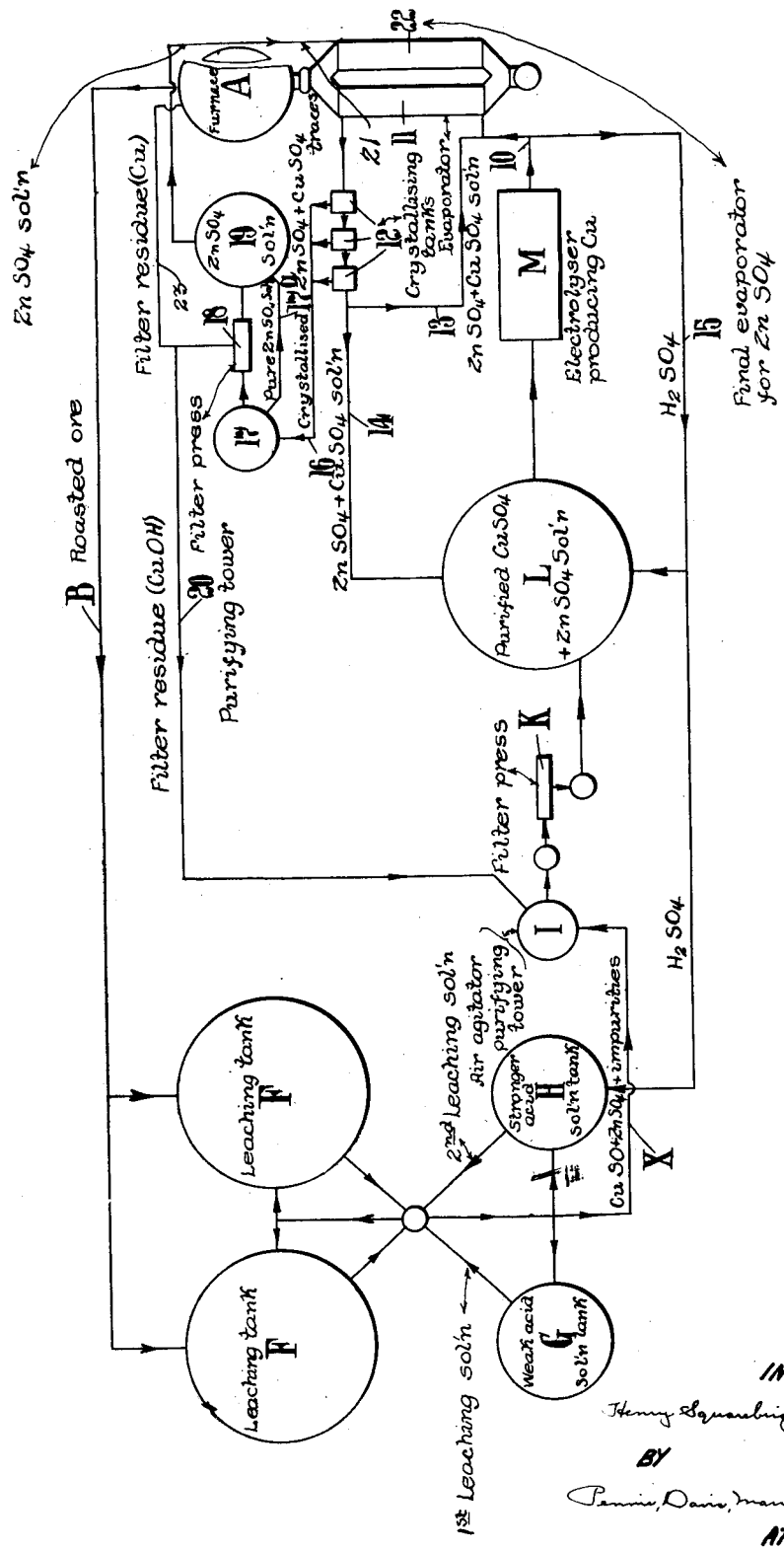
INVENTOR
Henry Squarebrigs Mackay
BY
Pennie, Davis, Marvin & Edmonds
ATTORNEYS Patented Nov. 26, 1929

1,737,425

UNITED STATES PATENT OFFICE

HENRY SQUAREBRIGS MACKAY, OF LONDON, ENGLAND

ELECTROCHEMICAL PROCESS FOR THE EXTRACTION OF COPPER AND ZINC FROM ORES

Application filed January 28, 1926, Serial No. 84,377, and in Great Britain September 24, 1925.

This invention relates to improvements in electro-chemical processes and apparatus for the extraction of copper and zinc from ores, and provides a method and means of producing electrolytic copper and zinc sulphate, or electrolytic zinc if desired, from ores containing copper, zinc, iron and other base metals.

My present invention is designed to enable all classes of copper ore containing zinc to be treated, and the copper and zinc to be respectively and separately extracted therefrom.

In electro-chemical processes for the extraction of copper from ores containing copper and zinc, the zinc in the ore goes into solution with the copper when the ore is leached with a solution of acid. Then when the solutions are treated by electrolysis the copper is deposited and the zinc builds up in the solutions as the process proceeds.

Processes heretofore used for recovering zinc from such ores have been carried out by precipitating the copper and other metals from the solution and leaving the zinc in the solution, which is afterwards treated either by electrolysis or by other methods to recover the zinc.

According to my present invention, I propose to remove the zinc from the solution in the form of sulphate, which, if desired, may be dissolved and electrolyzed to produce metallic zinc. I do this without removing all of the copper from solution. Thus, while continuously producing electrolytic copper I prevent the zinc from building up to excess in the solution, and at the same time I recover the zinc.

In carrying out my present invention, the ore is leached with a solution of sulphuric acid and the resultant solutions purified and electrolyzed in any suitable manner. After the solution has been electrolyzed and zinc has accumulated therein to near the saturation point, all or part of the solution is drawn off and passed through an evaporating plant. This evaporating plant is composed of pans or other apparatus of any suitable type for evaporating solutions. These pans comprising the evaporating plant may be advantageously heated by the furnace gases, produced from roasting the ore, or they may be heated by any other suitable means.

From the electrolyzer, the solution containing a low percentage of copper and a high percentage of zinc is run into the evaporating plant. Here the solution is concentrated by evaporation and part of the zinc is crystallized out without affecting the bulk of the copper in the solution. For example, if the solution carries 1% copper and 8% zinc and its volume is 100 cubic meters, it is evaporated down to 50 cubic meters. During this process about half the zinc in the solution will have been crystallized out as zinc sulphate, with now and then slight traces of copper, and the percentage of copper will have increased to 2%. But since the copper will not crystallize out in quantity until a much higher concentration is reached it is substantially not affected by the evaporation. By this principle of fractional crystallization part of the zinc can be continuously taken out of the solution without affecting the copper, except for some relatively slight traces which are dealt with as hereinafter described.

Any suitable processes may be used for extracting the copper and zinc in solution from the ores. I may employ the method illustrated in the accompanying flow sheet to which I shall now refer.

If necessary, the raw ores are roasted to render copper and zinc soluble. The ores, concentrates or residues are delivered from the furnace A by the conveyor B to the leaching tanks F.

Preferably two acid solutions are used for leaching, the first being applied to the ore in tanks F until a neutral or nearly neutral metal-enriched solution is obtained. This solution which is of relatively high specific gravity is then delivered through line X into the agitator I, and the ore in tanks F is then leached with the stronger acid solution to extract the remaining metals.

This charge of ore, exhausted of its desirable constituents is replaced in the tanks F by a fresh charge, and the acid solution last applied to the preceding charge is used as the first leaching solution of the fresh charge. When this solution has dissolved as much as possible of the metals it is passed on to the agitator I through line X, and a fresh stronger acid solution is applied to this charge of ore, and so on with each successive charge.

The weaker acid solution partly metal bearing is in each case contained in the tank G and the stronger acid solution in the tank H.

In the agitator or purifying tower I the iron, aluminium and other impurities are precipitated to the required extent by any known or suitable methods of purification, (e. g. by the addition of calcium carbonate,) leaving in the solution zinc as well as copper. The purified solution is then passed to a filter press K from which the clear solution is drawn off to a tank L.

The solution then flows through the electrolytic cells M where a part of the copper is deposited, leaving the zinc in the solution, which is then delivered through a line 10 to an evaporating plant 11 heated by the products of combustion of the furnace A. The solution is heated and evaporated in plant 11 until saturation of the zinc content is reached, whereupon the hot solution is passed to crystallizing tanks 12 and allowed to cool until a part of the zinc sulphate is crystallized out. The residual solution from the tanks 12 may be returned either through line 13 to the evaporating plant 11 to join further quantities of solution from the electrolytic cells M, or it may be returned through line 14 to the tank L.

A line 15 is provided to convey a part of the solution containing free sulphuric acid from the electrolytic cells M to the tanks L and H, to take care of cases in which quantities of the acid are required to standardize the solutions in either of the tanks.

The crystallized zinc sulphate formed in the crystallizing tanks 12 usually contains traces of copper. It is therefore passed through line 16 to a purifying tower 17, where it is re-dissolved and treated with a suitable reagent, such as calcium carbonate or zinc dust, to precipitate the copper. The clear solution thus obtained may then be decanted directly to a tank 19 through line 17ª, or the solution and precipitate may be passed to a filter press 18 and there separated. The clear zinc sulphate solution is then passed to the storage tank 19, and the precipitate (if calcium carbonate is used) returned by line 20 to the purifying tower I, where the copper hydrate may be employed to percipitate iron and aluminum by recombing as sulphate. When zinc dust is used as the reagent in the purifying tower 17, the metallic copper precipitated in the reaction may be taken on a conveyor line 23 from the filter press 18 to the furnace A, where the copper is remixed with the ore, concentrate or residue undergoing roasting.

A line 21 is provided for the purpose of conveying the pure zinc sulphate solution to the evaporating plant 22 in which it is evaporated to obtain crystallized zinc sulphate. If desired, the clear zinc sulphate solution may be electrolyzed to produce electrolytic zinc.

The present invention, therefore, provides a complete process for the separate recovery of zinc and copper from ores containing both of these metals. The copper is deposited in the form of electrolytic copper without interference by the zinc during electrolysis, and the zinc is recovered in the form of pure zinc sulphate solution, which may either be evaporated to obtain crystallized zinc sulphate or electrolyzed to produce electrolytic zinc. The entire process is carried on in continuous cycle without the mutual interference of the zinc and the copper.

With reference to the accompanying flow sheet I have described a complete process in accordance with my present invention sufficient to enable the same to be carried into practice by those skilled in the art.

As regards the methods of roasting, leaching and purifying, a detailed description of highly advantageous methods will be found in the specification of my United States Patent No. 1,598,296.

What I claim is:—

1. A process for recovering copper and zinc from ores or metallurgical products consisting in obtaining the copper and zinc in solution as sulphates, electrolyzing the solution, depositing a portion of the copper until the concentration of copper sulphate is low relatively to the zinc sulphate in the solution, evaporating such solution to crystallize out a portion of the zinc sulphate, redissolving the zinc sulphate crystals and treating the resulting solution with a reagent to precipitate as hydrates such copper or other impurities as may have been crystallized with the zinc, and employing the precipitated copper hydrate in the purification of the zinc and copper sulphate solution before electrolysis.

2. A process for recovering copper and zinc from ores or metallurgical products consisting in obtaining the copper and zinc in solution as sulphates, electrolyzing the solution, depositing a portion of the copper until the concentration of copper sulphate is low relatively to the zinc sulphate in the solution, evaporating such solution to crystallize out a portion of the zinc sulphate, redissolving the zinc sulphate crystals and treating the resulting solution with a reagent to precipitate as hydrates such copper or other impurities as may have been crystallized with the zinc, employing the precipitated copper hydrate in the purification of the zinc and copper sulphate solution before electrolysis, returning the solution from the zinc crystallizing tanks for further electrolysis and evaporation, and treating the pure zinc sulphate solution obtained by purification so as to recover the zinc metal.

HENRY SQUAREBRIGS MacKAY.